United States Patent
Aschauer

(10) Patent No.: US 7,793,768 B2
(45) Date of Patent: Sep. 14, 2010

(54) MOTOR DRIVEN BALL AND RAMP CLUTCHING SYSTEM FOR A MARINE TRANSMISSION

(75) Inventor: George Reisch Aschauer, 2214 Red Oak Ct. NE., Bemidji, MN (US) 56601

(73) Assignee: George Reisch Aschauer, Bemidji, MN (US)

(*) Notice: Subject to any disclaimer, the term of this patent is extended or adjusted under 35 U.S.C. 154(b) by 510 days.

(21) Appl. No.: 11/364,783

(22) Filed: Feb. 27, 2006

(65) Prior Publication Data

US 2007/0199792 A1    Aug. 30, 2007

(51) Int. Cl.
- B63H 23/08 (2006.01)
- F16D 27/12 (2006.01)
- F16D 13/54 (2006.01)

(52) U.S. Cl. ............ 192/21; 192/48.2; 192/51; 192/84.6; 192/114 R; 192/84.7

(58) Field of Classification Search .............. None
See application file for complete search history.

(56) References Cited

U.S. PATENT DOCUMENTS

| | | | | |
|---|---|---|---|---|
| 1,870,075 A | * | 8/1932 | Sutter | 74/6 |
| 2,848,086 A | * | 8/1958 | Warsaw | 192/93 A |
| 2,851,895 A | * | 9/1958 | Aschauer | 74/361 |
| 3,386,547 A | * | 6/1968 | Hansen | 192/51 |
| 5,236,070 A | * | 8/1993 | Simoncic et al. | 192/70.28 |
| 6,578,693 B2 | * | 6/2003 | Mayr | 192/84.6 |
| 6,978,874 B2 | * | 12/2005 | Miyoshi et al. | 192/70.12 |
| 2002/0094903 A1 | * | 7/2002 | Bratel et al. | 440/75 |

* cited by examiner

Primary Examiner—Rodney H Bonck

(57) ABSTRACT

An electric motor applies torque to a ball and ramp actuator element generating thrust that is transferred through a bearing from the stationary actuator to the rotating clutch pack elements of a marine transmission.

1 Claim, 3 Drawing Sheets

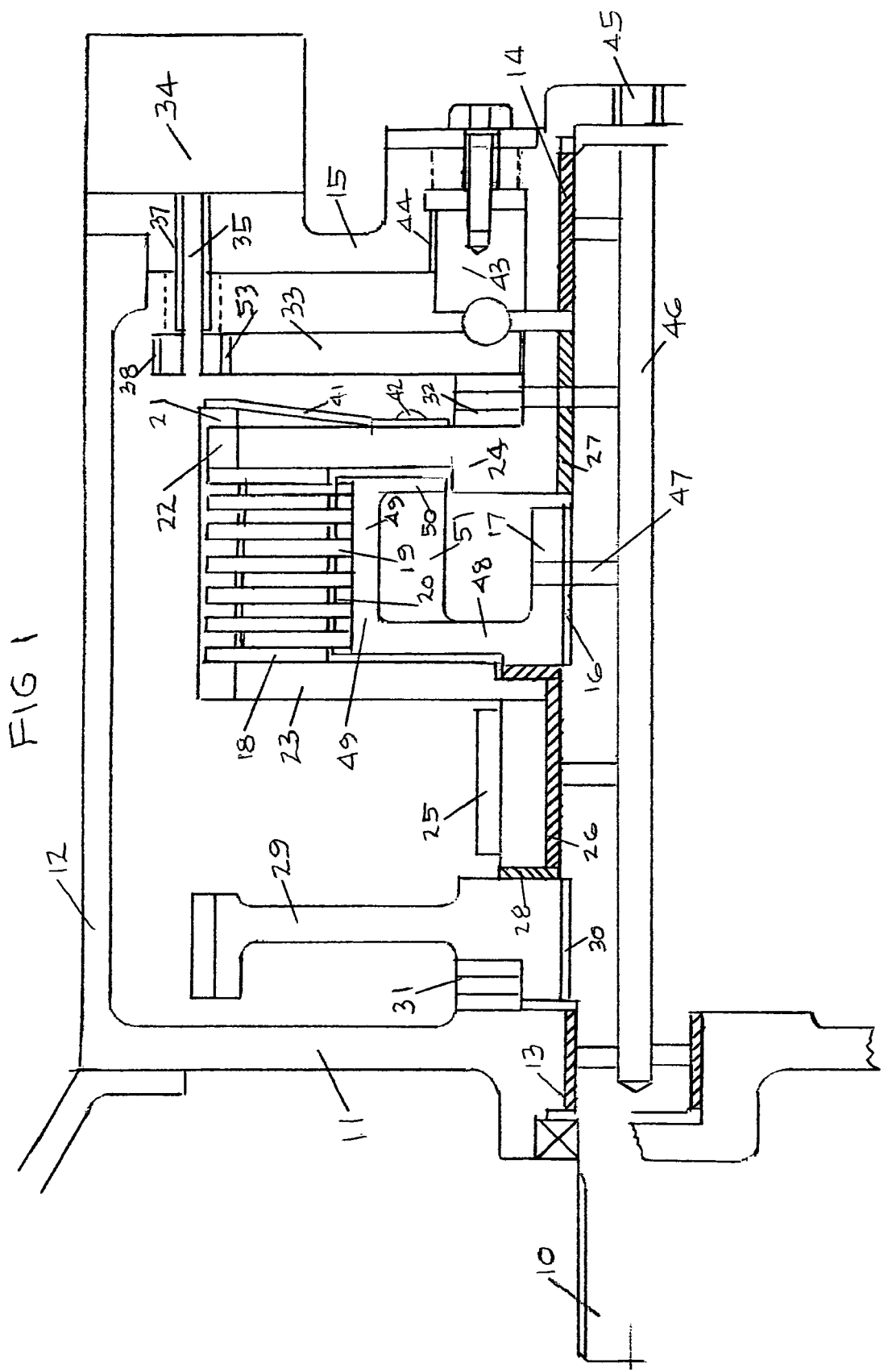

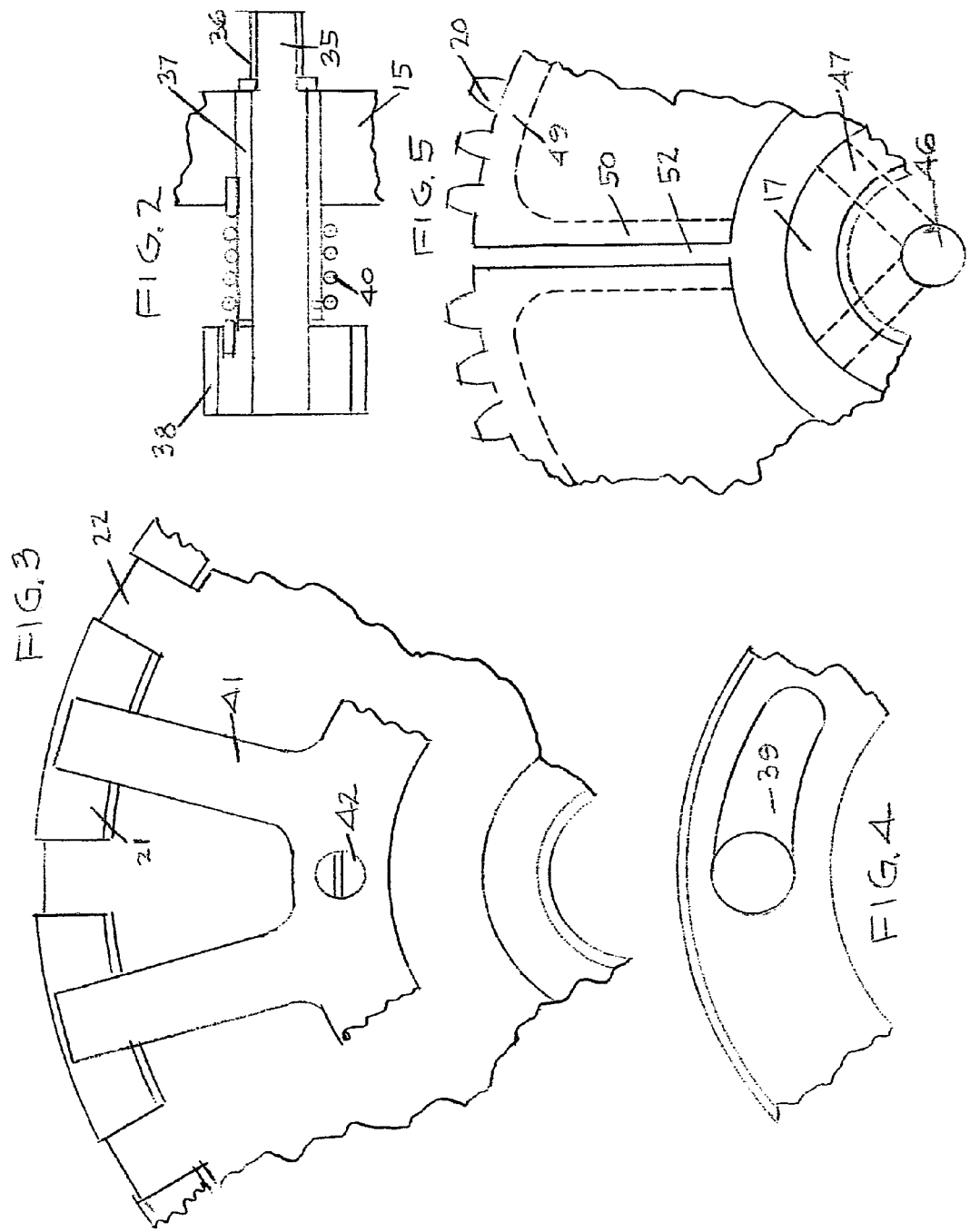

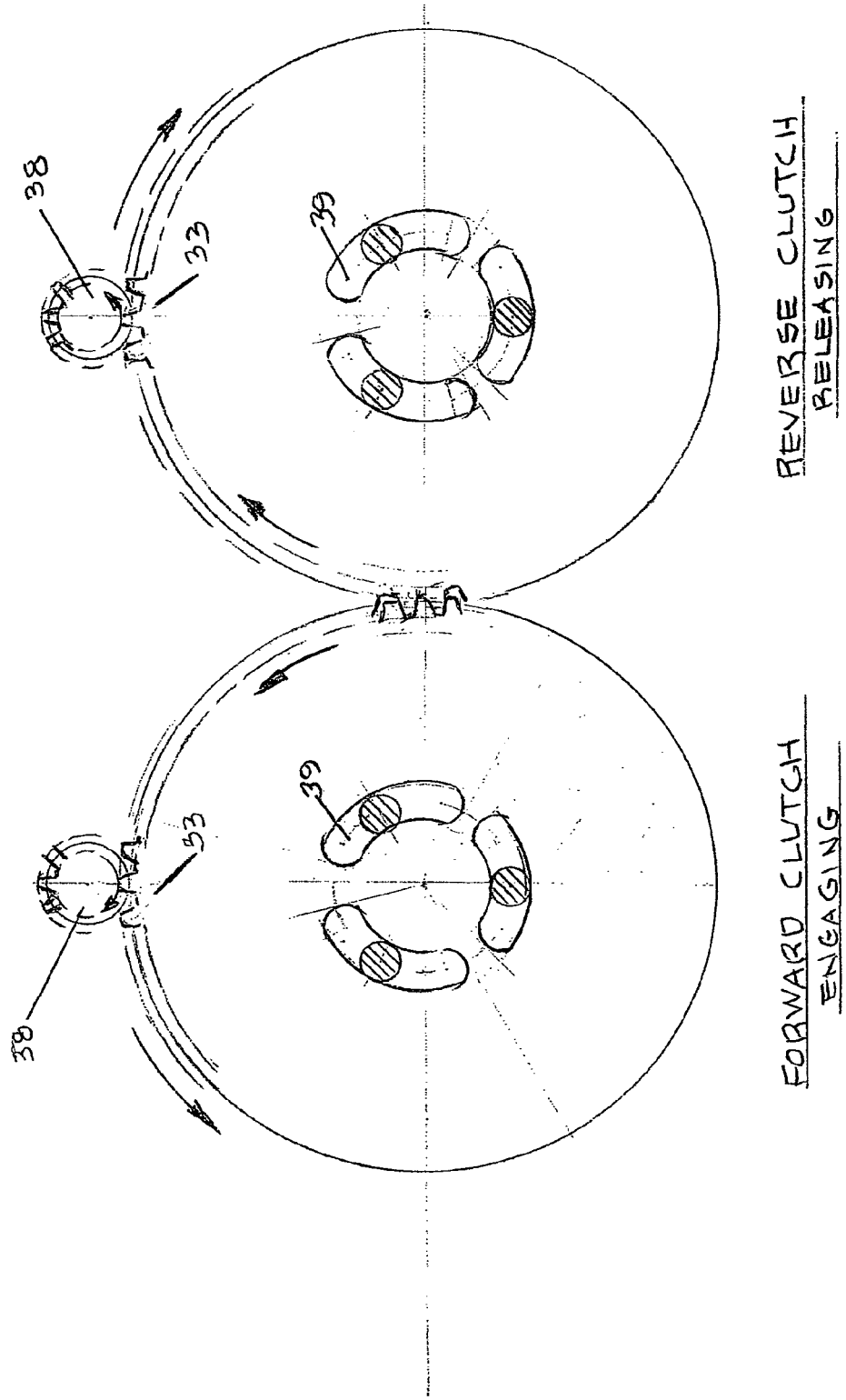

MOTOR DRIVEN BALL AND RAMP CLUTCHING SYSTEM FOR A MARINE TRANSMISSION

BACKGROUND OF THE INVENTION

The invention relates to the design of selectively operable friction clutches in a marine transmission to provide forward and reverse drives to the propeller shaft of a vessel.

U.S. Pat. No. 2,851,895 Aschauer describes a marine transmission drive that has been extensively used. It is intended that the gearing and clutch locations shown on U.S. Pat. No. 2,851,895 be utilized for this invention. These gear and shaft locations are shown on end view FIG. 3. Clutches are mounted on the input shaft and countershaft in transverse coplanar relationship, shown on FIGS. 1 and 2 of U.S. Pat. No. 2,851,895.

U.S. Pat. No. 2,851,895 describes a marine reverse and reduction gear. FIG. 1 shows how input power from an engine drives two input members of multiple plate oil lubricated friction clutches in reverse rotations, as shown by FIGS. 2 and 3. The output of an engaged clutch drives pinion 35 for forward and pinion 58 for reverse. The pinions mesh with output gear 36 on shaft 37 to drive a propeller either forward or reverse. Cooling oil passes through small holes in the input members plates drive.

It is to be noted the clutches utilized in the aforementioned patent are engaged by applying oil pressure to rotating annular pistons housed in their respective cylinders. The engaging system requires numerous components, as a pump, pressure regulating valve, control valve, and seals to transfer oil from the stationary components into the rotating clutches, as shown in FIG. 4 of U.S. Pat. No. 2,851,895. Erratic clutch behavior may result between a control signal and clutch actuation resulting from time and pressure losses between the control valve and clutch cylinders. It is desirable to have a clutch move into engagement quickly and have a torque rise programmed to provide a near constant level of energy absorption instead of potentially damaging peaks.

The pump flow required for optimum clutch engagement and cooling at lower engaging engine speeds rises at full engine speed since the pump is engine driven and results in power loss.

It is planned that the invention's electric engaging motor provides torque using minimal power input.

BRIEF SUMMARY OF THE INVENTION

The invention relates to both the engaging and releasing means for forward and reverse wet multiple plate clutches in a marine transmission, using relatively stationary ball ramp thrust actuators to provide clutch engagement pressure through thrust bearings to the rotating plate stacks. Both elements of the ball ramp actuators have numerous gear teeth on their outer diameter meshing with each other and also teeth on a smaller pinion driven by an attached electric motor. The motor may establish high level torque for full engine power or lower level varying torque for modulation as in trolling for a vessel. A microprocessor may program engaging conditions. Springs establish clutch plate release, actuator release, and motor release conditions when the motor is de-energized. An electric motor can be programmed to provide varying or constant torque input to the ball ramp actuator, avoiding the hydraulic complexities as discussed earlier.

BRIEF DESCRIPTION OF THE DRAWINGS

FIG. 1 is a longitudinal section of a marine transmission clutch shaft or its clutch countershaft. The only difference between the two is a splined input engine drive shown above and the enclosed countershaft portion shown below the centerline.

FIG. 2 is an enlarged view of the pinion drive used to rotate the geared element of the ball ramp into engagement.

FIG. 3 is a multiple finger spring used for clutch disengagement, as well as ball ramp disengagement positioning.

FIG. 4 shows a typical arcuate recess applied to a ball ramp circular member.

FIG. 5 is a transverse section of the friction plate cooling method to provide uniform plate cooling distribution.

FIG. 6 shows how the forward and reverse second rotatable circular members are geared together to provide continued release for one as the other rotates into engagement or overlock. One or more reversible electric motors and pinion assemblies may be used for actuation. As either clutch circular member engages, the other continues to be released with travel in either direction approximately equal.

In a marine transmission, the forward and reverse clutches must act together as one to release as the other is engaged. As either clutch engages, describing an angular movement for the second rotatable circular member, the opposite clutch must remain released for the same angular movement, as shown.

A number of design features differ from common marine transmission practices, such as:

The engaging mechanism does not rotate at engine speed. As it is stationary, no centrifugal mechanical or fluid forces act upon it.

Clutch plate release can be adjusted and optimized to prevent flutter.

A small direct current electric motor provides clutch operation, and it can be operated energized in a zero RPM or stalled output mode for extended periods.

Antifriction bearings carrying the clamping thrust from the stationary ball ramp members to the rotating clutch parts protect the actuation components from adverse engine torsional activity.

Either the forward or reverse clutch may be advanced into an overlocked mode for full ahead or crash back requiring no electric motor power to provide full engine torque, including a clutch torque reserve factor.

DETAILED DESCRIPTION OF THE INVENTION

Referring to FIG. 1, input shaft 10 is appropriately attached to a driving member, such as the flywheel of a vessel's power plant (not shown). The shaft is journaled by bearing 13 carried by housing wall 11 at the input and journaled by bearing 14 carried by end plate cover wall 15 detachable from housing 12. Input hub 17 is attached to input shaft 10 by close-fitting splines 16 in the conventional manner. Interleaved friction plates 19 and spacer plates 18 make up a friction plate stack package. Input hubs gear teeth 20 support and drive friction plates 19 providing sliding engagement. Spacer plates 18 have lugs 22 that engage with cantilever beams 21 that support and drive the spacer plates 18 and provide sliding engagement. Cantilever beams 21 are integrally attached to output member backplate 23. Pressure plate 24 has lugs 22 that are thicker lengthwise than the lugs on spacer plates 18 and also engage with cantilever beams 21 in like manner. Backplate 23 is integrally attached to drive pinion 25 and supported on shaft 10 by bearing 26. Pressure plate 24 is likewise supported on shaft 10 by bearing 27. A confined annular chamber is bounded by the plate stack inner diameter at its outside, hub 17 at the inside, backplate 23 on the resisting side, and pressure plate 24 on the engaging side. Clutch clamping thrust is carried axially by pinion 25 through plain thrust bearing 28 to transfer gear 29, which is attached to shaft 10 by close-fitting splines 30. Clutch clamping thrust from transfer gear 29 is transferred through antifriction thrust bearing 31 to housing wall 11. Antifriction thrust bearing 32, which may be similar to thrust bearing 31, transfers clutch clamping thrust from the relatively stationary ball ramp engaging system to the rotating clutch elements. Ball and ramp thrust systems are widely used and known to the art. They usually include a pair of circular members having opposed pairs of arcuate recesses receiving load transferring members, such as balls, providing thrust when one circular member is rotated with respect to the other.

The invention utilizes an electric motor producing torque at static output speed after actuating a movable ball ramp rotor a portion of a revolution. Use of an electric motor 34 powered from an external source is shown on FIG. 1. Motor 34 engages and drives shaft 35 through splines on shaft 35. Pinion 38 is rigidly attached to shaft 35. Sleeve 37 acting as a bearing to support shaft and pinion assembly 35 and 38 is pressed rigidly into housing 15. Rotatable ball ramp element 33 has gear teeth 53 meshing with like teeth on pinion 38 to provide a large reduction ratio between the pinion diameter and ball ramp gear pitch diameters. Pinion 38, therefore, has large angular rotation compared to that of ramp 33 during engagement. FIG. 4 shows a typical arcuate ball ramp recess 39. Longer recesses allow lower ramp angle and provide greater thrust but require greater ramp rotation readily available through the electric motor gear reduction means used in the invention. Ramp angles terminating as flats may allow over-locked clutch engagement.

The electric motor used to activate pinion 38 and rotatable ball ramp component 33 can be a brushless D.C. motor. The clutch clamping force may be reduced by the ramp angle to 5 to 10 percent of the clamp, and further reduced by ramp to gear and gear to pinion ratios. The motor can be small and operate stalled. By stall, it is meant that the motor is energized with the output held at zero RPM. This is used for variable trolling torque, as required. The electric motor is usually designed for high-speed operation and can react quickly. FIG. 1 shows only the friction clutch used on forward operation. The reverse clutch is driven in the opposite direction, as referred by Aschauer U.S. Pat. No. 2,851,895, gear teeth on rotatable ball ramp element 33 of the forward mesh with those on the reverse rotatable ball ramp element. One or more electric motors may be used for actuation. The ball ramp may have multiple angles:

Steep, for engaging taking up plate release.
Low, for trolling.
High, for engaging for full power.
Negative, for overlock.

The motor is pulse energized for release of either the forward or reverse clutch from overlock. When the ball ramp is in overlock, the motor may be de-energized. The vessel may then run full ahead or astern drive with no electric motor power. The electric motor is at zero RPM motor speed. The negative overlock holds the ball at full engaged position. Both the forward friction clutch and the reverse friction clutch have identical but opposite ball ramp designs. When one friction clutch engages, the other must continue in release by virtue of the meshing gears providing opposite rotation.

FIG. 3 shows finger spring 41 attached to pressure plate 24 by screws 42. The fingertips bear against cantilever beam 21 ends to establish proper clutch plate released clearance. Spring 41 also sets up an overall axial force to maintain proper residual contact for the thrust bearings and ball ramp components when the clutch is disengaged. Stationary ball ramp 43 has threads 44 on its outside diameter to adjust out the numerous axial part tolerances and establish the residual force desired.

Since clutch actuation is controlled by an external power source, clutch cooling and bearing lubrication is visualized as using an external electric motor cooling oil pump drive system. Only low pressure and flow is required since the clutches are not engaged by hydraulic means.

The oil flow required for the invention is used for clutch plate cooling and bearing lubrication only.

Oil is introduced into shaft 10 through port 45 in housing end cover wall 15. FIG. 5 shows an end view of hub member 17 having external teeth 20, driving friction plates 19. Oil introduced through inlet 45 flows axially through shaft longitudinal hole 46 and radially outward through passages 47 to fill a series of individual cavities 51, each bounded by drive wall 48, cylindrical top wall 49, and retaining wall 50. During clutch rotation, cooling oil flows into the individual cavities 51 inwardly filling them. Added oil then flows under the bottoms of spaced radial walls 50 discharging outwardly through radial slot passages 52 cut completely through walls 50. Pump passage 52 delivers pressure and oil flow uniformly across the complete friction pack inner diameter.

The pumping passages 52 are sealed by the engaged plate stack to maintain a pressure head under them, an advancement over the drilled holes used in U.S. Pat. No. 2,851,895.

During continuous clutch slip utilizing hydroviscous power transmission, the complete confined annular chamber may be filled with oil pressure raised to drive the required oil flow through the entire stack friction plate face grooving. Operating a released clutch with the oil filled confined annular chamber could provide objectional drag where an air/oil mix does not.

I claim:

1. A marine reversing transmission comprising two friction clutches, one to provide forward vessel motion, the other reverse motion, each friction clutch comprising a friction pack having a plurality of friction discs; each clutch further including a first, rotationally fixed, axially adjustable circular member having a first plurality of arcuate recesses, a second rotatable circular member disposed adjacent the first circular member and having a second plurality of arcuate recesses, and a plurality of load transferring members disposed in the arcuate recesses and acting, upon relative rotation of the circular members in one direction, to produce an axial engaging force on a respective friction pack via an axial thrust bearing and releasing the axial engaging force upon relative rotation of the circular members in an opposite direction; at least one electric motor having an output pinion geared to the second rotatable circular member of at least one of the clutches, the second rotatable circular member of one of the clutches being geared to the second rotatable circular member of the other of the clutches; and a disengaging spring system comprising a torsion coil spring coupled between a rotationally fixed housing element and the output pinion of the at least one electric motor, the disengaging spring system further comprising a finger spring associated with each of the clutches, each finger spring comprising a circular inner portion fixed to a pressure plate of a respective clutch and having radially extending fingers bearing against cantilever beams of a housing of the respective clutch and biasing the pressure plate in a clutch-releasing direction.

* * * * *